United States Patent
Laine et al.

(10) Patent No.: US 10,317,196 B2
(45) Date of Patent: Jun. 11, 2019

(54) NAVIGATION SYSTEMS AND METHODS USING FIBER OPTIC SHAPE SENSORS AND LOCALIZED POSITION SENSORS

(71) Applicants: The Charles Stark Draper Laboratory, Inc., Cambridge, MA (US); Luna Innovations Incorporated, Roanoke, VA (US)

(72) Inventors: Juha-Pekka J. Laine, Boston, MA (US); Bruce Dow, West Newbury, MA (US); Marc McConley, Andover, MA (US); Gregory Blasche, Burlington, MA (US); Paul Bohn, St. Petersburg, FL (US); Matthew S. Bottkol, Boston, MA (US); Michael Ricard, Natick, MA (US); Evan M. Lally, Blacksburg, VA (US); Sandra M. Klute, Blacksburg, VA (US); Matthew T. Reaves, Baltimore, MD (US); Emily H. Templeton, Blacksburg, VA (US); James Donna, Watertown, MA (US)

(73) Assignee: THE CHARLES STARK DRAPER LABORATORY, INC., Cambridge, MA (US)

(*) Notice: Subject to any disclaimer, the term of this patent is extended or adjusted under 35 U.S.C. 154(b) by 122 days.

(21) Appl. No.: 15/186,051

(22) Filed: Jun. 17, 2016

(65) Prior Publication Data
US 2016/0370177 A1    Dec. 22, 2016

Related U.S. Application Data

(60) Provisional application No. 62/180,829, filed on Jun. 17, 2015.

(51) Int. Cl.
*G01D 5/26* (2006.01)
*G01B 11/16* (2006.01)

(52) U.S. Cl.
CPC ............ *G01B 11/16* (2013.01); *G01D 5/268* (2013.01)

(58) Field of Classification Search
CPC ......... G01B 11/16; G01B 11/24; G01L 19/00; G01L 1/242; G01L 1/246; G01L 11/025;
(Continued)

(56) References Cited

U.S. PATENT DOCUMENTS 6,415,223 B1 * 7/2002 Lin ..................... G01C 21/20
340/988
8,050,523 B2 * 11/2011 Younge ............... A61B 5/1076
385/13
(Continued)

OTHER PUBLICATIONS

International Search Report and Written Opinion for International Patent Application No. PCT/US2016/038187 dated May 22, 2017 (17 Pages).

*Primary Examiner* — Que Tan Le
*Assistant Examiner* — Jennifer D Bennett
(74) *Attorney, Agent, or Firm* — Lando & Anastasi, LLP

(57) ABSTRACT

Systems and methods for determining the shape and/or position of an object are described. A fiber optic shape sensor (FOSS) may be used in combination with one or more inertial measurement units (IMUs) to mutually cross-correct for errors in the sensors' measurements of position and/or orientation. The IMU(s) may be attached to the FOSS's optical fiber, such that each IMU measures the orientation of a corresponding portion of the optical fiber. The position and shape of the optical fiber can then be determined based on the measurements obtained from the IMU(s) and the measurements obtained from the FOSS. For example, the FOSS measurements and the IMU measurements can be provided to a state estimation unit (e.g., a Kalman filter), which can estimate the position and/or shape of the optical fiber based on those measurements. In some embodiments, the estimates
(Continued)

of position are used for navigation of tethered mobile devices.

34 Claims, 6 Drawing Sheets

(58) Field of Classification Search
CPC ............... G01D 5/268; G01D 5/35361; G01D 5/35358; G01D 5/35364; G01D 5/35312; G01D 5/35316; A61B 34/20; A61B 2034/2061; A61B 5/065
See application file for complete search history.

(56) References Cited

U.S. PATENT DOCUMENTS

| | | | | |
|---|---|---|---|---|
| 2007/0287992 | A1* | 12/2007 | Diolaiti | G05B 19/19 606/1 |
| 2009/0324161 | A1* | 12/2009 | Prisco | G01L 1/246 385/13 |
| 2011/0098533 | A1 | 4/2011 | Onoda et al. | |
| 2011/0319714 | A1* | 12/2011 | Roelle | A61B 1/00006 600/118 |
| 2013/0286378 | A1 | 10/2013 | Dutoit | |
| 2015/0124266 | A1 | 5/2015 | Davis et al. | |
| 2016/0058519 | A1* | 3/2016 | Herr | A61B 5/107 600/438 |

* cited by examiner

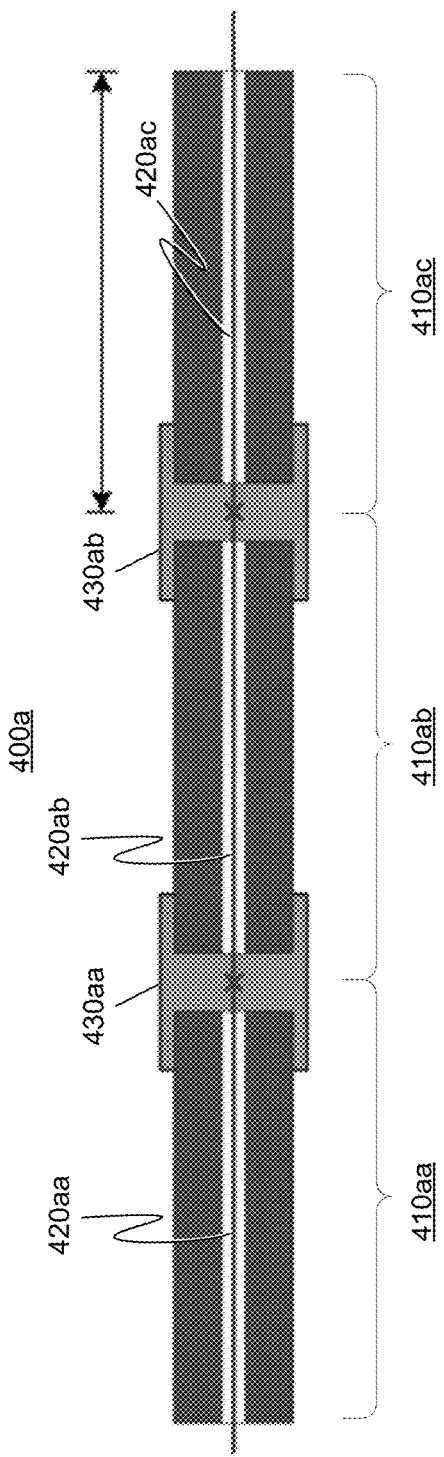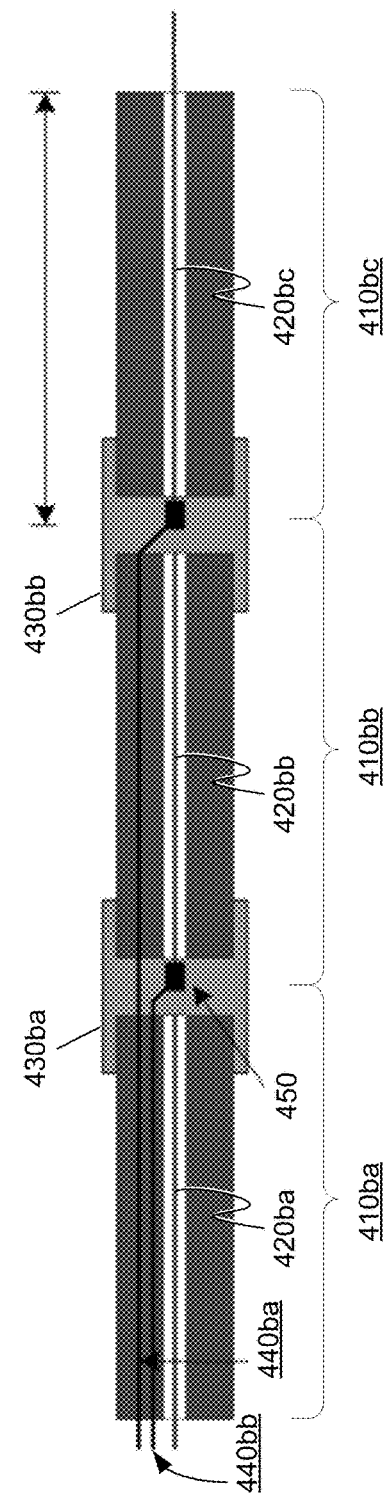
FIG. 4A
FIG. 4B

NAVIGATION SYSTEMS AND METHODS USING FIBER OPTIC SHAPE SENSORS AND LOCALIZED POSITION SENSORS

CROSS-REFERENCE TO RELATED APPLICATION

This application claims priority to and the benefit of U.S. Provisional Patent Application No. 62/180,829 titled "Inertial-Aided Fiber Shape Sensor" and filed on Jun. 17, 2015, which is hereby incorporated herein by reference in its entirety.

STATEMENT REGARDING FEDERALLY SPONSORED RESEARCH OR DEVELOPMENT

This invention was made with government support under Grant No. 2014-14071000012 awarded by the Intelligence Advanced Research Projects Activity (IARPA). The government has certain rights in the invention.

FIELD OF THE INVENTION

The present disclosure relates generally to systems and methods for determining the shape and/or position of an object. Some embodiments relate specifically to systems and methods for navigation based on measurements obtained from a distributed spatial sensor and one or more localized position sensors.

BACKGROUND

In general, navigation involves determining an object's location and/or orientation within a reference frame. Positioning systems are sometimes used for navigation. Positioning systems typically facilitate determination of an entity's location by transmitting signals from a set of transmitters having known (though not necessarily fixed) locations. For example, suitable signals may be transmitted from satellites, mobile phone towers, or Wi-Fi access points. The global positioning system (GPS) is an example of a satellite-based positioning system. When received by a suitable receiving device (e.g., a GPS receiver), the signals transmitted by a positioning system permit the receiving device to determine its location via triangulation, trilateration, or other suitable location-detection technique. In areas where the positioning signals transmitted by a positioning system are not reliably received, determining an object's position via the positioning system may be difficult or impossible.

Inertial navigation systems are also used for navigation. In contrast to a positioning system, an inertial navigation system (INS) determines an object's location based on a trusted initial location and data collected from one or more inertial measurement units (IMUs). An IMU determines the acceleration of an object and changes in the orientation of the object based on measurements provided by one or more accelerometers and/or gyroscopes physically connected to the object. An INS uses dead reckoning (a state estimation technique) to estimate the location and velocity of the object based on the acceleration and orientation measurements obtained from the IMU(s). In particular, after establishing an initial trusted location, the INS integrates the measurements provided by the IMU(s) to estimate the object's velocity and position as the object moves. Errors in the INS's estimate of the object's location generally increase over time due to the integration of uncompensated errors in the measurements obtained from the IMU(s), a phenomenon which is referred to herein as "time-dependent drift" or simply "drift." During long excursions, drift can lead to significant errors in the estimated position of the object. The rate of drift can be reduced by performing zero-velocity updates (ZUPTs) during times when the IMU(s) are stationary. However, performing a ZUPT is often impractical, because the object is often not stationary, and placing the object in a stationary state is often infeasible.

A distributed spatial sensor, (e.g., a fiber optic shape sensor (FOSS)), is a third type of sensor that can measure the spatial positions and angular positions (e.g., orientations) of portions of a flexible cable or fiber (e.g., an optical fiber), and the shape of the flexible cable or fiber. Some fiber optic shape sensors obtain these measurements by using one or more fiber cores and an optical frequency domain reflectometer that transmits light to and receives reflected light from the optical fiber cores. In this way, the FOSS can measure the distributed strain on the fiber cores, which can be used to determine the position and shape of the optical fiber.

Fiber optic shape sensors with relatively short optical fibers can be used in a variety of medical instruments, including catheters, endoscopes, arthroscopes, colonoscopes, laparoscopes, and balloon catheters. With such instruments, the measurements obtained by the FOSS can be used to determine the location of the tip of the instrument inside the patient's body, the path of the instrument through the patient's body, etc. This information can be used to improve outcomes for related medical procedures, including catheterization, endoscopy, arthroscopy, colonoscopy, laparoscopy, and angioplasty.

For conventional distributed spatial sensors, imperfections in sensor calibration and noise in the measurement data can lead to errors in the sensor's measurements of position and shape. Some conventional long-length fiber optic shape sensors measure their shape and end-point position with an error of approximately 0.5% to 1.0% of the length of the optical fiber. The magnitudes of such errors generally grow larger as the length of the optical fiber increases, and can eventually reach unacceptable levels for some applications involving very long fiber lengths. Also, conventional FOSS may not provide accurate measurements of position and shape if the optical fiber experiences a significant, rapid change in its shape or state of strain while the measurements are being obtained.

SUMMARY OF THE INVENTION

There exists a need for techniques to improve the accuracy of fiber optic shape sensors in general and long fiber optic shape sensors in particular. Errors in the position measurements provided by conventional fiber optic shape sensors tend to be highly correlated with the orientation (e.g., attitude and/or rotation) of the sensor's optical fiber. Thus, correcting for errors in the fiber optic shape sensor's measurements of the fiber's orientation can reduce errors in the measurements of position.

The inventors have recognized and appreciated that the accuracy of a fiber optic shape sensor's measurements of position and shape can be improved by using the FOSS in combination with one or more localized position sensors to correct for errors in the FOSS's measurements of the fiber's orientation. For example, one or more IMUs may be attached to the FOSS's optical fiber, such that each IMU measures the orientation of a corresponding portion of the optical fiber. The position and shape of the optical fiber can then be determined based on the measurements obtained from the IMU(s) and the measurements obtained from the FOSS. For example, the FOSS measurements and the IMU measurements can be provided to a state estimation unit (e.g., a Kalman filter), which can estimate the position and/or shape of the optical fiber based on those measurements. In some embodiments, the estimates of position may be used for navigation of tethered mobile devices.

According to an aspect of the present disclosure, a navigation system is provided, including a first sensing device including a distributed spatial sensor, wherein the first sensing device is operable to produce distributed measurements of one or more spatial characteristics of the distributed spatial sensor selected from the group consisting of shape, spatial position, and angular position; a second sensing device including one or more localized position sensors corresponding to one or more respective portions of the distributed spatial sensor, wherein the second sensing device is operable to produce, for each of the localized position sensors, localized measurements of one or more positional characteristics of the corresponding portion of the distributed spatial sensor selected from the group consisting of spatial position and angular position; and an estimating unit operable to estimate one or more states of the navigation system based, at least in part, on the distributed measurements and the localized measurements.

In some embodiments, the distributed spatial sensor includes a distributed fiber optic shape sensor including an optical fiber. In some embodiments, the optical fiber includes one or more optical fiber cores. In some embodiments, the distributed spatial sensor is operable to produce measurements of distributed strain along the optical fiber, and the first sensing device is operable to produce the distributed measurements of the one or more spatial characteristics of the distributed spatial sensor based, at least in part, on the measurements of the distributed strain along the optical fiber.

In some embodiments, the one or more localized position sensors include at least one sensor device operable to produce measurements of an angular position of a corresponding portion of the distributed spatial sensor. In some embodiments, the sensor device includes an inertial measurement unit including at least one sensor selected from the group consisting of a gyroscope and an accelerometer. In some embodiments, the sensor device includes a magnetometer.

In some embodiments, the one or more localized position sensors include at least one sensor device operable to produce measurements of a spatial position of a corresponding portion of the distributed spatial sensor. In some embodiments, the sensor device is selected from the group consisting of a pressure sensor and a positioning system receiver. In some embodiments, the sensor device includes an imaging device.

In some embodiments, the second sensing device is further operable to produce, for each of the localized position sensors, localized measurements of a gravity vector at the corresponding portion of the distributed spatial sensor. In some embodiments, the one or more localized position sensors include a first position sensor, the one or more portions of the distributed spatial sensor include a first portion of the distributed spatial sensor, the first position sensor corresponds to the first portion of the distributed spatial sensor, and the first position sensor is connected to the first portion of the distributed spatial sensor. In some embodiments, the first portion of the distributed spatial sensor includes an end portion of the distributed spatial sensor.

In some embodiments, the first sensing device is further operable to determine one or more positions of the one or more portions of the distributed spatial sensor corresponding to the one or more respective localized position sensors. In some embodiments, the one or more estimated states of the system include at least one navigational parameter selected from the group consisting of a location of at least a portion of the distributed spatial sensor, an orientation of at least a portion of the distributed spatial sensor, a shape of at least a portion of the distributed spatial sensor, and a velocity of at least a portion of the distributed spatial sensor. In some embodiments, the estimating unit is further operable to estimate an uncertainty in the at least one navigational parameter based, at least in part, on the distributed measurements and the localized measurements.

In some embodiments, the estimating unit is operable to estimate the one or more states using at least one filter selected from the group consisting of a Kalman filter, an enhanced Kalman filter, and a particle filter. In some embodiments, the estimating unit is operable to estimate the one or more states using at least one numerical state estimation technique selected from the group consisting of weighted averaging, generalized state space estimation, and optimal state estimation. In some embodiments, the estimating unit is operable to estimate the one or more states based, at least in part, on calibration data indicating one or more positions of the one or more portions of the distributed spatial sensor corresponding to the one or more respective localized position sensors.

In some embodiments, the first sensing device is operable to produce a first measurement of a position of an end portion of the distributed spatial sensor, the second sensing device is operable to produce a second measurement of the position of the end portion of the distributed spatial sensor, the one or more estimated states include an estimate of the position of the end portion of the distributed spatial sensor, and the estimate of the position of the end portion of the distributed spatial sensor is more accurate than the first and second measurements of the position of the end portion of the distributed spatial sensor.

In some embodiments, the estimating unit is further operable to estimate a value of a compensation parameter of the first sensing device based, at least in part, on the localized measurements. In some embodiments, the distributed measurements produced by the first sensing device include corrected distributed measurements, the distributed spatial sensor is operable to produce raw distributed measurements of one or more spatial characteristics of the distributed spatial sensor, and the first sensing device is operable to produce the corrected distributed measurements based, at least in part, on the raw distributed measurements and the estimated value of the compensation parameter. In some embodiments, the first sensing device is further operable to use the compensation parameter to compensate for an error in a measurement of an angular position of a portion of the distributed spatial sensor. In some embodiments, the estimated value of the compensation parameter is indicative of an error in a measurement of an angular position of a portion of the distributed spatial sensor. In some embodiments, the first sensing device is further operable to calibrate the distributed spatial sensor based, at least in part, on the estimated value of the compensation parameter.

In some embodiments, the one or more position sensors include a first position sensor corresponding to a first portion of the distributed spatial sensor, and the estimating unit is further operable to estimate a value of a compensation parameter of the first position sensor based, at least in part, on the distributed measurements. In some embodiments, the localized measurements produced by the second sensing device include corrected localized measurements, each of the position sensors is operable to produce raw localized measurements of one or more positional characteristics of the corresponding portion of the distributed spatial sensor, and the second sensing device is operable to produce the corrected localized measurements based, at least in part, on the raw localized measurements and the estimated value of the compensation parameter. In some embodiments, the second sensing device is further operable to use the compensation parameter to compensate for at least one error of the first position sensor selected from the group consisting of a bias error, a scale factor error, a gravity-sensitive error, and a misalignment error. In some embodiments, the estimated value of the compensation parameter is indicative of at least one error of the first position sensor selected from the group consisting of a bias error, a scale factor error, a gravity-sensitive error, and a misalignment error. In some embodiments, the second sensing device is further operable to calibrate the first position sensor based, at least in part, on the estimated value of the compensation parameter.

In some embodiments, the estimating unit is further operable to determine whether at least one of the one or more localized position sensors is in a quasi-static state based, at least in part, on the distributed measurements; and initiate a zero velocity update of the at least one localized position sensor when it is determined that the at least one localized position sensor is in the quasi-static state.

In some embodiments, the system further includes a mobile device, and the estimated one or more states of the system include at least one navigational parameter selected from the group consisting of a location of the mobile device, an orientation of the mobile device, and a path of the mobile device. In some embodiments, the mobile device is selected from the group consisting of a robot, a medical instrument, a drill, and a vehicle. In some embodiments, the estimating unit is further operable to perform at least one task selected from the group consisting of simultaneous localization and mapping (SLAM) and path stitching based, at least in part, on the estimated at least one navigational parameter.

According to another aspect of the present disclosure, a navigation method is provided, including: producing distributed measurements of one or more spatial characteristics of a distributed spatial sensor selected from the group consisting of shape, spatial position, and angular position; for each of one or more localized position sensors corresponding to one or more respective portions of the distributed spatial sensor, producing localized measurements of one or more positional characteristics of the corresponding portion of the distributed spatial sensor selected from the group consisting of spatial position and angular position; and estimating one or more states of a navigation system based, at least in part, on the distributed measurements and the localized measurements.

Particular implementations of the subject matter described in the present disclosure may realize one or more of the following advantages. In some embodiments, a navigation system which includes a distributed spatial sensor (e.g., a fiber optic shape sensor) and one or more localized position sensors (e.g., inertial measurement units) may perform mutual correction of errors in the measurements of the constituent sensing devices based on the measurements of the other sensing device(s). The navigation system may provide accurate estimates of an object's position which do not exhibit significant drift even after long periods of time. The navigation system may provide accurate estimates of an object's position which do not exhibit significant error even when long optical fibers (e.g., optical fibers with lengths of 100 meters or greater) are used for fiber optic shape sensing. The navigation system may provide accurate estimates of an object's position even during periods when the fiber optic shape sensor is experiencing a significant, rapid change in its shape or state of strain during a short period of time. In some embodiments, the navigation system measures the shape and end-point position of an optical fiber with an average error as low as approximately 0.1% of the length of the fiber, or lower in some embodiments.

Particular implementations of the subject matter described in the present disclosure may also be used for a variety of applications. For example, a navigation system which includes a distributed spatial sensor (e.g., a fiber optic shape sensor) and one or more localized position sensors (e.g., inertial measurement units) may be used for navigation of tethered mobile devices, including terrestrial and extraterrestrial devices. In particular, the navigation system may be used for navigation of drilling equipment in underground or offshore drilling operations, for navigation of vehicles (e.g., autonomous vehicles (AVs) and/or remotely operated vehicles (ROVs)) in underground or underwater exploration operations, or for navigation of any other suitable tethered mobile device. Embodiments described herein may be particularly advantageous when used for navigation in underground or underwater environments, because positioning systems on their own may be unreliable in such environments, and the accuracy of inertial navigation systems on their own may be inadequate for certain operations (e.g., drilling operations and/or exploration operations) in such environments. As another example, some embodiments may be used for simultaneous localization and mapping (SLAM) tasks, for robotic mapping, or for robotic path stitching.

Other aspects and advantages of the invention will become apparent from the following drawings, detailed description, and claims, all of which illustrate the principles of the invention, by way of example only. The foregoing summary, including the description of motivations for some embodiments and/or advantages of some embodiments, is intended to assist the reader in understanding the present disclosure, and does not in any way limit the scope of any of the claims.

BRIEF DESCRIPTION OF THE DRAWINGS

Various embodiments of the present disclosure may be understood by referring to the following description taken in conjunction with the accompanying drawings. In the drawings, like reference characters generally refer to the same parts throughout the different views. Also, the drawings are not necessarily to scale, emphasis instead generally being placed upon illustrating principles of some embodiments of the invention.

FIGS. 4A, 4B, and 4C show schematics of respective cables for connecting a distributed spatial sensor and one or more localized position sensors, according to some embodiments.

DETAILED DESCRIPTION

Terms

As used herein, the "spatial characteristics" of an object may include the shape and/or position (e.g., spatial position and/or angular position) of the object or a portion thereof. The spatial characteristics of the object may be absolute or measured relative to a reference position.

As used herein, a set of "distributed measurements" of an object's spatial characteristics may include measurements that are distributed over at least a portion of the object and have high resolution relative to the size of that portion of the object. For example, in a set of distributed measurements, the average distance between adjacent measurements may be on the order of centimeters, millimeters, hundreds of micrometers, tens of micrometers, micrometers, or less. As another example, a set of distributed measurements may include one measurement per centimeter of length for an object with a minimum bend radius of 10 centimeters in the length direction. As another example, a set of distributed measurements may include measurements that are distributed over at least a portion of an object and are continual throughout that portion of the object.

As used herein, "positional characteristics" of an object may include the position (e.g., spatial position and/or angular position) of the object or a portion thereof, which may be measured relative to a reference position. Alternatively or in addition, the positional characteristics of an object may include the velocity of the object or a portion thereof, and/or the gravity vector acting on the object or portion thereof.

As used herein, "localized measurements" of an object's positional characteristics may include individual measurements of the object's positional characteristics or a set of measurements that are distributed over at least a portion of the object and have resolution that is smaller in length relative to the size of that portion of the object. For example, in a set of localized measurements, the average distance between adjacent measurements may be on the order of tens of centimeters, meters, or greater.

An Exemplary System for Determining the Shape and/or Position of an Object

Figure 1:
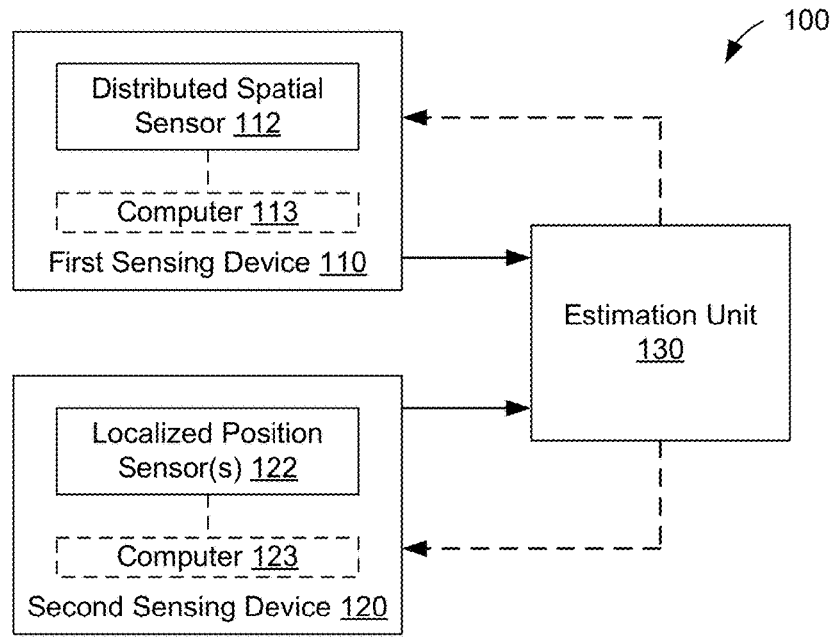
FIG. 1 shows a block diagram of a system for determining the shape and/or position of an object, according to some embodiments.

FIG. 1 shows a system 100 for determining the shape and/or position of an object, according to some embodiments. The system 100 may be used as a navigation system. In the example of FIG. 1, the system 100 includes a first sensing device 110 and a second sensing device 120, both of which provide measurements to an estimation unit 130. In particular, the first sensing device 110 includes a distributed spatial sensor 112 and provides distributed measurements of spatial characteristics of an object to the estimation unit 130. The second sensing device 120 includes one or more localized position sensors 122 and provides localized measurements of positional characteristics of an object to the estimation unit 130. The estimation unit 130 may use the measurements provided by the sensing devices to estimate the spatial and/or positional characteristics of an object (e.g., position, shape, etc.), to estimate values of compensation parameters which can be used to compensate for errors in the measurements obtained by the sensing devices, and/or to estimate values of other suitable parameters (e.g., navigational parameters).

The distributed spatial sensor 112 of the first sensing device 110 provides measurements (e.g., distributed three-dimensional measurements) of spatial characteristics of an object. In some embodiments, the distributed spatial sensor 112 is a FOSS. The FOSS may include an optical fiber with one or more fiber cores (e.g., one or more single core optical fibers or a multi-core optical fiber with one or more fiber cores). The FOSS may measure distributed strain along the optical fiber and produce measurements (e.g., distributed measurements) of spatial characteristics of the optical fiber based on the measurements of distributed strain. In some embodiments, the FOSS is implemented as described in U.S. Pat. Nos. 7,772,541, 8,733,650, and/or 8,531,655 which are hereby incorporated by reference herein in their entireties.

Relative to the localized position sensors 122, the distributed spatial sensor 112 may measure position (e.g., absolute or relative three-dimensional position) with similar accuracy and with coarser precision, and may exhibit little drift in accuracy over time. In some embodiments, there may be significant statistical correlation (e.g., 0.8 or higher, 0.85 or higher, or 0.86 or higher) between the distributed spatial sensor's measurements of the angular position (e.g., orientation) and the spatial position of the optical fiber.

In some embodiments, the distributed spatial sensor 112 includes an optical fiber having two or more optical cores used to measure the internal distribution of strain within the fiber to determine the fiber's shape and orientation. In some embodiments, one or more single core optical fibers are bonded to a structure to measure the distribution of strains of the structure to determine the shape and orientation of the structure.

In some embodiments, the first sensing device 110 also includes a computer 113. The computer 113 may control the operation of the distributed spatial sensor 112 (e.g., by initiating the collection of measurements at times or under conditions determined by a program executing on the computer 113). In some embodiments, the computer 113 can calibrate the distributed spatial sensor 112 using suitable calibration data. In some embodiments, the computer 113 can generate corrected measurements of the spatial characteristics of an object by applying a corrective model to raw measurements of the spatial characteristics of the object obtained by the distributed spatial sensor 112. The calibration procedure used by the computer 113 to calibrate the distributed spatial sensor 112 and/or the corrective model used by the computer 113 to generate the corrected measurements may have one or more compensation parameters, the values of which may be provided by the estimation unit 130. In some embodiments, the first sensing device 110 may provide the corrected measurements to the estimation unit 130 in addition to or in lieu of providing the raw measurements.

Referring still to FIG. 1, each of the localized position sensors 122 of the second sensing device 120 provides measurements (e.g., localized measurements) of positional characteristics of a corresponding portion of an object (e.g., a portion of the optical fiber of a fiber optic shape sensor of the first sensing device 110). In some embodiments, a localized position sensor 122 may be any sensor or actuator that provides measurements that can be used to determine the spatial position and/or angular position (e.g., attitude, rotation, orientation, etc.) of a localized portion of a distributed spatial sensor 112. In some embodiments, at least one localized position sensor 122 measures the angular position (e.g., attitude and/or rotation) of a corresponding portion of the optical fiber. For example, the localized position sensor(s) 122 may include an IMU, which may determine the angular position of a portion of the optical fiber based on measurements obtained from one or more gyroscopes, accelerometers, and/or magnetometers.

In some embodiments, at least one localized position sensor 122 measures the spatial position of a corresponding portion of an optical fiber of a FOSS of the first sensing device 110. For example, the localized position sensor(s) 122 may include a pressure sensor, which may measure an altitude, elevation, or depth of a corresponding portion of the optical fiber. As another example, the localized position sensor(s) 122 may include a positioning system receiver (e.g., a GPS receiver), which may measure the absolute location of the corresponding portion of the optical fiber.

Relative to the distributed spatial sensor 112, the localized position sensor(s) 122 may measure position (e.g., absolute three-dimensional position) with similar or better accuracy when used for dead reckoning, may measure position with finer precision, and may exhibit significant drift in accuracy over time.

In some embodiments, the second sensing device 120 also includes a computer 123. The computer 123 may control the operation of the localized position sensor(s) 122 (e.g., by initiating the collection of measurements at times or under conditions determined by a program executing on the computer 123). In some embodiments, the computer 123 can calibrate the localized position sensors 122 using suitable calibration data. In some embodiments, the computer 123 can generate corrected measurements of the positional characteristics of an object by applying one or more corrective models to raw measurements of the positional characteristics of the object obtained by the localized position sensor(s) 122. The calibration procedure used by the computer 123 to calibrate the localized position sensor(s) 122 and/or the corrective model(s) used by the computer 123 to generate the corrected measurements may employ one or more compensation parameters, the values of which may be provided by the estimation unit 130. In some embodiments, the second sensing device 120 may provide the corrected measurements to the estimation unit 130 in addition to or in lieu of providing the raw measurements.

In some embodiments, the first sensing device 110 and the second sensing device 120 have complementary properties. For example, the first sensing device 110 may not provide accurate measurements while portions of the distributed spatial sensor 112 are moving, but the second sensing device 120 may provide accurate measurements even while the localized position sensor(s) 122 are moving. As another example, the accuracy of the first sensing device 110 may depend on the values of one or more parameters (e.g., the angular positions of portions of the distributed spatial sensor 112), and the second sensing device 120 may provide accurate measurements of the values of those parameters. In some embodiments, the use of sensing devices 110 and 120 with complementary properties can yield significant improvements in the accuracy of the system 100.

The estimation unit 130 may estimate one or more system states based on the measurements provided by the sensing devices (e.g., based on a combination of the spatial measurements provided by the first sensing device 110 and the positional measurements provided by the second sensing device 120). The states estimated by the estimation unit 130 may include positional characteristics of the localized position sensor(s) and/or spatial characteristics of the distributed spatial sensor. In addition or in the alternative, the states estimated by the estimation unit 130 may include the values of navigational parameters, for example, the location, orientation, path, velocity, etc. of an object or a portion thereof. The estimated positions (e.g., location and orientation) may be absolute or relative to reference positions. The object characterized by the spatial, positional, or navigational data may be a tethered mobile device (e.g., medical instrument; robot; autonomous vehicle (AV), remotely operated vehicle (ROV), or other vehicle; drill or other drilling equipment; etc.) or a portion thereof, the distributed spatial sensor 112 or a portion thereof (e.g., the end portion of an optical fiber), or any other suitable object. In some embodiments, the estimates of spatial characteristics, positional characteristics, and/or navigational parameters provided by the estimation unit 130 are more accurate than the corresponding measurements provided by the first sensing device 110 and the second sensing device 120.

The states estimated by the estimation unit 130 may include the values of compensation parameters which can be used to compensate for errors in the measurements obtained by the sensing devices. For example, the first sensing device 110 may use at least one of the compensation parameters for recalibration of the distributed spatial sensor 112 or for correction of errors in raw measurements (e.g., raw measurements of curvature, twist, strain, etc.) obtained by the distributed spatial sensor 112. The compensation parameter may be, for example, a parameter of a calibration procedure performed by the computer 113 on the distributed spatial sensor 112, or a parameter of a corrective model applied to the raw measurements of the distributed spatial sensor 112 by the computer 113. The second sensing device 120 may use at least one of the compensation parameters for recalibration of the localized position sensor(s) 122 or for correction of errors in raw measurements obtained by the localized position sensor(s) 122. The compensation parameter may be, for example, a parameter of a calibration procedure performed by the computer 123 on the localized position sensor(s) 122, or a parameter of a corrective model applied to the raw measurements of the localized position sensor(s) 122 by the computer 123. The estimation unit 130 may determine updated values of the compensation parameters and/or provide the updated values to the sensing devices at scheduled times, continually, periodically, intermittently, in response to occurrence of specified events (e.g., after each new set of measurements is obtained from the first sensing device 110), or at any other suitable times.

In some embodiments, the estimation unit 130 estimates the amount of uncertainty in the estimated values provided by the estimation unit. The estimates of uncertainty may be based on the measurements provided by the first sensing device 110 and/or the measurements provided by the second sensing device 120.

In some embodiments, the estimation unit 130 implements a state estimation filter (e.g., Kalman filter, enhanced Kalman filter, particle filter, etc.) or another state estimation technique (e.g., weighted averaging, generalized state space estimation, optimal state estimation, etc.) to estimate the values of the states and/or the uncertainty therein. As described above, the estimates may be based, at least in part, on the measurements provided by the first sensing device 110 and/or the measurements provided by the second sensing device 120. In some embodiments, the estimates are further based on inter-sensor calibration data that indicate which portions of the distributed spatial sensor 112 correspond to the respective localized position sensors 122.

Figure 2A:
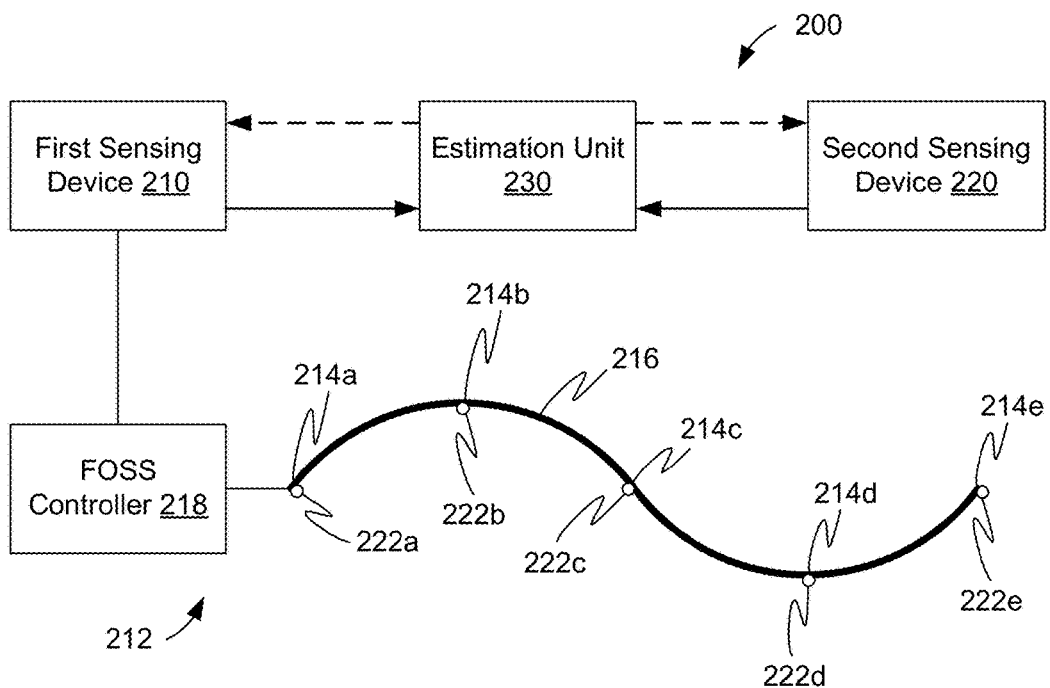
FIG. 2A shows a block diagram of an embodiment of the system depicted in FIG. 1.

FIG. 2A shows a system 200 which is an embodiment of the system 100 for determining the shape and/or position of an object. The system 200 includes a first sensing device 210, a second sensing device 220, and an estimation unit 230, which are embodiments, respectively, of the first sensing device 110, the second sensing device 120, and the estimation unit 130 of the system 100. The first sensing device 210 includes a FOSS 212, which is an embodiment of the distributed spatial sensor 112, and the second sensing device 220 includes IMUs 222, which are embodiments of the localized position sensors 122.

The fiber optic shape sensor 212 includes an optical fiber 216 and a controller 218. The optical fiber 216 includes one or more fiber cores. The controller 218 includes an optical frequency domain reflectometer that can transmit light to and receive reflected light from the fiber cores. Based on the properties of the reflected light received by the reflectometer, the controller can measure the distributed strain on the fiber cores and, based thereon, provide measurements (e.g., distributed measurements) of spatial characteristics of the optical fiber 216.

In the example of FIG. 2A, the second sensing device 220 includes five IMUs 222a-e, which are attached, respectively, to five portions 214a-e of the optical fiber 216. Each IMU 222 can produce measurements (e.g., localized measurements) of the IMU's positional characteristics. Since the IMUs 222 are attached to corresponding portions 214 of the optical fiber 216, the positional characteristics of each IMU 222 are substantially similar to the positional characteristics of the corresponding portion 214 of the optical fiber 216. Thus, each IMU can produce measurements (e.g., localized measurements) of the positional characteristics of a corresponding portion of the optical fiber 216. (In some embodiments, either the second sensing device 120 or the estimation unit 130 may apply a corrective model to compensate for the difference between the nominal position of an IMU 222 and the nominal position of the corresponding portion 214 of the optical fiber 216.)

In the example of FIG. 2A, the system 200 includes five IMUs 222, with two IMUs 222a and 222e located at the ends of the optical fiber 216, and the other three IMUs 222b-222d evenly distributed along the length of the optical fiber 216. However, some embodiments are not limited to the number or arrangement of IMUs shown in FIG. 2A. The system 200 may include any suitable number of IMUs 222 arranged in any suitable way. In some embodiments, the system 200 includes a single IMU 222 attached to the end portion 214e of the optical fiber (i.e., the end of the optical fiber that is furthest from the reflectometer). Attaching an IMU 222 to the end portion 214e of the optical fiber 216 can significantly improve the accuracy of the system 200, since the accumulated error of the raw measurements provided by the fiber optic shape sensor 212 is generally greatest at the end portion 214e of the optical fiber 216.

In some embodiments, the first sensing device 210 produces inter-sensor calibration data indicating which portions 214 of the optical fiber 216 correspond to the respective IMUs 222. As described in further detail below, the inter-sensor calibration data may be generated by a cable that provides mechanisms for attaching IMUs 222 to the optical fiber 216. The first sensing device 210 may provide the inter-sensor calibration data to the estimation unit 230 to facilitate estimation of navigational parameters, compensation parameters, etc.

In some embodiments, the FOSS 212 and the IMUs 222 have complementary attributes. For example, error in the FOSS measurements generally grows as a function of the length of the optical fiber 216, whereas error in the IMU measurements generally grows as a function of the amount of time elapsed since the most recent zero velocity update (ZUPT). As another example, the FOSS 212 generally provides accurate measurements while the optical fiber 216 is not rapidly moving (e.g., not experiencing significant changes in shape or strain over a relatively short time period), whereas the IMUs generally can provide accurate measurements even while the optical fiber 216 is moving. As yet another example, the FOSS 212 may not provide highly accurate measurements of the orientations of portions of the optical fiber 216, whereas the IMUs 222 generally can provide highly accurate measurements of the orientations of the corresponding portions 214 of the optical fiber 216.

Referring still to FIG. 2A, the estimation unit 230 may estimate the values of compensation parameters (and, optionally, the uncertainty thereof) based on the measurements provided by the first sensing device 210, the measurements provided by the second sensing device 220, and/or the inter-sensor calibration data. The compensation parameters may include one or more parameters $P_A \ldots P_E$ suitable for compensating for errors in the FOSS measurements of the orientations of the portions 214a-e of the optical fiber 216 corresponding to the IMUs 222a-e. For example, the estimation unit 230 may use the inter-sensor calibration data to determine which of the measurements provided by the first sensing device 210 represent the orientations of the portions 214a-e of the optical fiber 216. For each such portion 214 of the optical fiber 216, the estimation unit 230 may determine the difference D1 between the orientation measurement provided by the FOSS 212 and the orientation measurement provided by the corresponding IMU 222. The value of the compensation parameter P for the orientation of a particular portion 214 of the optical fiber 216 may be equal to the difference D1 between the orientation measured by the FOSS 212 and by the IMU 222 for that portion of the optical fiber, or may otherwise be calculated based on the difference D1. Alternatively, the value of the compensation parameter P for a particular portion 214 of the optical fiber 216 may be equal to the orientation measurement provided by the corresponding IMU 222 for that portion of the fiber.

The estimation unit 230 may provide the values of the compensation parameters $P_A \ldots P_E$ to the first sensing device 210, which may use the compensation parameters to compensate for the errors in the FOSS measurements of the orientations of the portions 214a-e of the optical fiber 216. In some embodiments, the first sensing device 210 uses the compensation parameters P to recalibrate the FOSS 212. In some embodiments, the compensation parameters P are parameters of a corrective model used by the first sensing device 210 to convert the raw measurements provided by the FOSS 212 into corrected measurements. For example, applying the corrective model may replace the FOSS measurements of the orientations of the portions 214 of the optical fiber 216 with the corresponding IMU measurements, or otherwise adjust the FOSS measurements of the orientations based on the differences between the FOSS measurements and the corresponding IMU measurements. Applying the corrective model may also correct the FOSS measurements of the position and shape of the optical fiber 216 based on the corrected orientation values. As a result, the use of the compensation parameters P may enhance the accuracy of the measurements provided by the first sensing device 210, and may reduce the accumulation of error over the length of the optical fiber 216.

The compensation parameters may also include one or more parameters Q suitable for compensating for errors in the IMU measurements caused by bias error, scale factor error, gravity-sensitive error, misalignment error, etc. For example, the estimation unit 230 may use the inter-sensor calibration data to determine which of the measurements provided by the first sensing device 210 represent the spatial positions of the portions 214a-e of the optical fiber 216 corresponding to the IMUs 222a-e. For each IMU 222, the estimation unit 230 may determine the difference D2 between the spatial position measurement provided by the FOSS 212 and the spatial position measurement provided by the corresponding IMU 222. The value of the compensation parameter Q for the position of the IMU 222 may be equal to the difference D2 between the positions measured by the FOSS 212 and by the IMU 222 for the corresponding portion 214 of the optical fiber 216, or may otherwise be calculated based on the difference D2. Alternatively, the value of the compensation parameter Q for a particular IMU 222 may be equal to the position measurement provided by the FOSS 212 for the corresponding portion 214 of the optical fiber 216.

The estimation unit 230 may provide the values of the compensation parameters Q to the second sensing device 220, which may use the compensation parameters Q to compensate for the errors in the IMU measurements of the positions of the IMUs. In some embodiments, the second sensing device 220 uses the compensation parameters Q to recalibrate the IMUs 222, which may reduce the bias error, scale factor error, gravity-sensitive error, misalignment error, etc. of one or more IMUs. In some embodiments, the compensation parameters Q are parameters of a corrective model used by the second sensing device 220 to convert the raw measurements provided by the IMUs 222 into corrected measurements. For example, applying the corrective model may replace the IMU measurements of the positions of the IMUs 222 with the FOSS measurements of the positions of the corresponding portions 214 of the optical fiber 216, or otherwise adjust the IMU measurements of the positions based on the differences between the FOSS measurements and the corresponding IMU measurements. As a result, the use of the compensation parameters Q may enhance the accuracy of the measurements provided by the second sensing device 220 (e.g., by reducing the accumulation of error over time).

In some embodiments, the estimation unit 230 initiates zero velocity updates (ZUPTs) of the IMUs when the IMUs 222 are in a quasi-static state. As described above, performing a ZUPT when an IMU is stationary may reduce the error in the measurements provided by the IMU, particularly when a long period of time has elapsed since the IMU's previous ZUPT. However, the system 200 may be used for applications in which the IMUs 222 are rarely or infrequently stationary. For such applications, the accuracy of the IMU measurements (and therefore the accuracy of navigational parameters derived from the IMU measurements using dead reckoning techniques) may be improved by performing the ZUPTs when the IMUs are in a quasi-static state. An IMU is in a quasi-static state when the IMU is not in a completely static state (e.g., not completely stationary), but is not experiencing a significant amount of motion. In some embodiments, the estimation unit 230 can determine whether an IMU 222 is stationary or in a quasi-static state based on the measurement data provided by the sensing devices 210 and 220, and can initiate a ZUPT of an IMU when the IMU is determined to be stationary or in a quasi-static state.

The estimation unit 230 may determine whether an IMU 222 is an a quasi-static state using any suitable technique. For example, the estimation unit 230 may receive a signal indicating that the optical fiber 216 of the distributed spatial sensor 212 is stationary, and based thereon, the estimation unit may determine that the IMUs 222 are in a quasi-static state. Such a signal may be provided, for example, by an operator of a sensing system 200 when the optical fiber 216 is known to be stationary (e.g., when the fiber is not being driven in a system in which the fiber is stationary unless driven).

Some embodiments have been described in which a system 100 or 200 is used for navigation of a tethered mobile device. For example, the end portion of a fiber optic shape sensor can be connected to the mobile device, and the system 100 or 200 may be used to determine the position and/or path of the end portion of the FOSS, which closely approximates the position and/or path of the mobile device. Examples of suitable mobile devices may include drilling equipment (e.g., for underground or offshore drilling), vehicles (e.g., AVs or ROVs for underground or underwater exploration), etc.

In some embodiments, the system 100 or 200 may be used to perform other tasks, including, without limitation, simultaneous localization and mapping (SLAM), robotic mapping, and path stitching. "Path stitching" generally refers to a process of mapping a region (e.g., a network of tubes), in which a robot or vehicle pulls a distributed spatial sensor through the region, and measurements from the distributed spatial sensor are "stitched" together to form a map of paths through the region. When conventional fiber optic shape sensors are used for path stitching, the length of the FOSS's optical fiber is generally chosen to be of the same order of magnitude as the length of the curvature features of the path being mapped. Otherwise, rotation of the FOSS's optical fiber may go undetected, leading to significant error in the results of the path stitching process. By contrast, when some embodiments of the system 100 are used for path stitching, the length of the FOSS's optical fiber may be much shorter than the length of the path's longest curvature feature, because the orientation measurements provided by the localized position sensors 122 greatly reduce the risk of undetected rotation of the FOSS's optical fiber.

Figure 2B:
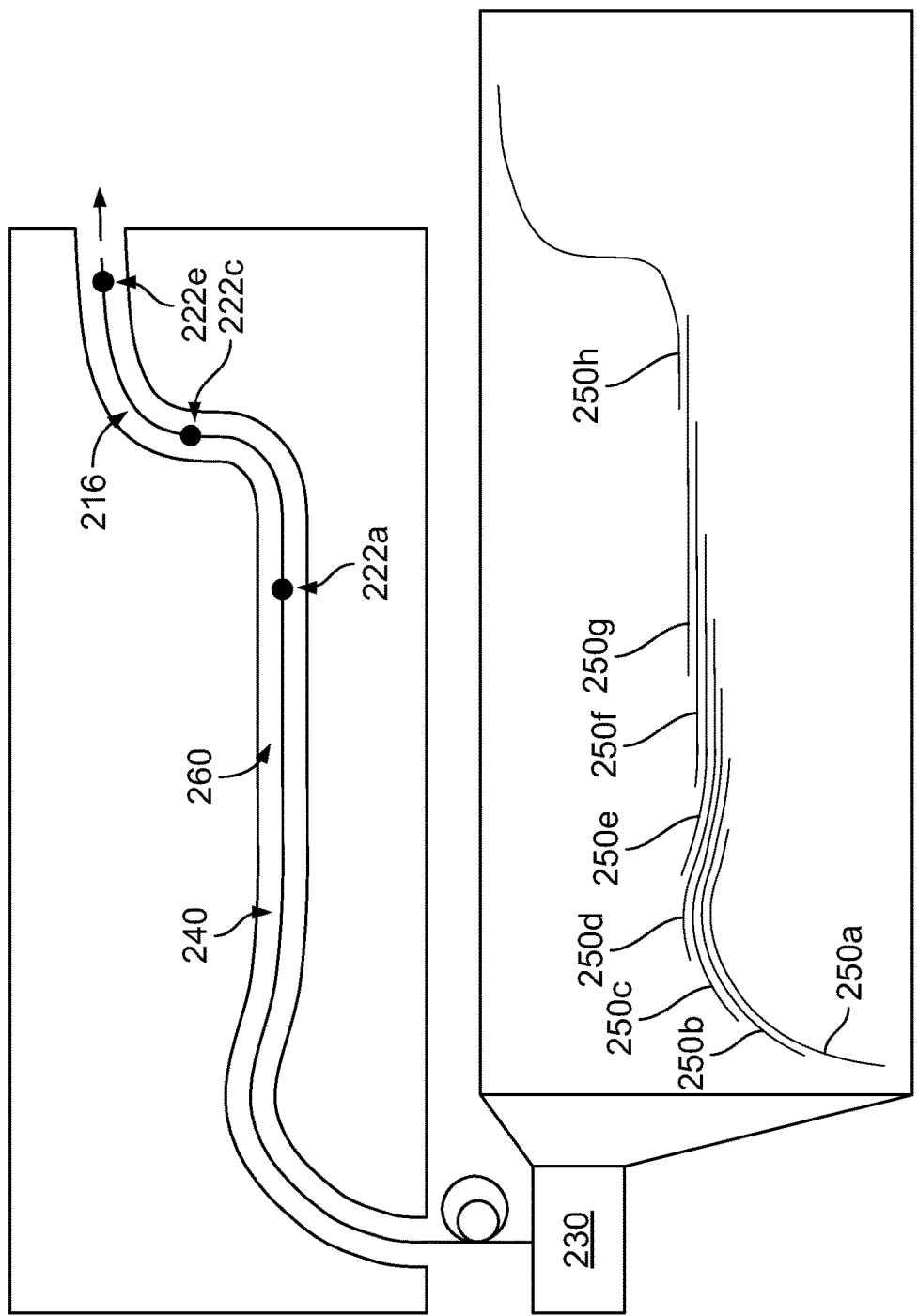
FIG. 2B shows an illustration of a stitched path measurement technique, according to some embodiments.

An illustration of path stitching technique that may be performed with an embodiment of the system 200 is shown in FIG. 2B. In the example of FIG. 2B, an optical fiber 216 of a FOSS is pulled along a constrained path 260. In the example of FIG. 2B, IMUs 222 are attached to the optical fiber 216, and the optical fiber 216 is coupled to an estimation unit 230 by a cable 240 (e.g. a standoff cable). In some embodiments, as the optical fiber 216 is pulled along the constrained path 260, the estimation unit 230 generates overlapping measurements 250a-250h of the spatial characteristics of the optical fiber 216. In some embodiments, the overlapping measurements 250 are stitched together to form a map of the constrained path 260.

Some embodiments have been described in which the localized position sensors (e.g., IMUs 222) are attached to corresponding portions (e.g., portions 214) of a distributed spatial sensor. In some embodiments, the localized position sensors may be co-located with the corresponding portions of a distributed spatial sensor, without being attached or connected to those portions of the distributed spatial sensor. In some embodiments, the localized position sensors are not co-located with the corresponding portions of the distributed spatial sensor. Rather, the localized position sensors may be configured to remotely monitor the corresponding portions of the distributed spatial sensor. For example, a localized position sensor may be an imaging device (e.g., camera, laser tracker, etc.), which may be configured to obtain images a corresponding portion of a distributed spatial sensor, with or without fiducial markers.

Some embodiments have been described in which a distributed spatial sensor 112 provides distributed measurements of spatial characteristics of an object, and one or more positional sensors 122 provide localized measurements of positional characteristics of the object. In some embodiments, the distributed spatial sensor provides measurements of spatial characteristics of an object (including the object's shape), and the individual positional sensor(s) provide individual measurements of positional characteristics of different portions of the object but do not provide individual measurements of the shape of the object.

An Exemplary Method for Determining the Shape and/or Position of an Object

Figure 3:
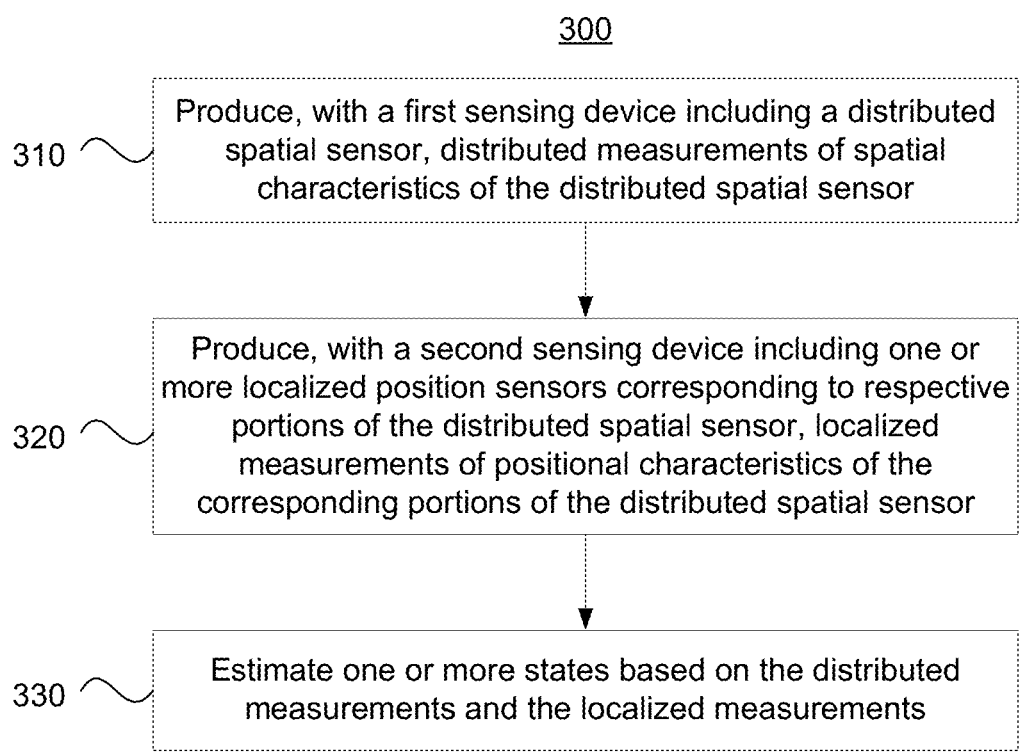
FIG. 3 shows a flowchart of a method for determining the shape and/or position of an object, according to some embodiments.

FIG. 3 illustrates a method 300 for determining the shape and/or position of an object, according to some embodiments. The method 300 may include steps 310-330. At step 310, a first sensing device which includes a distributed spatial sensor is used to produce measurements (e.g., distributed measurements) of spatial characteristics of the distributed spatial sensor. At step 320, a second sensing device is used to produce measurements (e.g., localized measurements) of positional characteristics of portions of the distributed spatial sensor. The second sensing device includes one or more localized position sensors which correspond to portions of the distributed spatial sensor and produce the measurements of the positional characteristics of those portions of the distributed spatial sensor. At step 330, one or more states (e.g., values of spatial characteristics, positional characteristics, navigational parameters, compensation parameters, etc.) are estimated based on the measurements provided the first and second sensing devices. Some embodiments of the method 300 are described in further detail below.

At step 310, a first sensing device produces measurements (e.g., distributed measurements) of spatial characteristics of a distributed spatial sensor. The spatial characteristics may include the shape of the distributed spatial sensor and the positions (e.g., spatial and/or angular positions) of portions of the distributed spatial sensor. In some embodiments, the distributed spatial sensor is a FOSS that measures distributed strain along an optical fiber and produces the measurements of spatial characteristics of the optical fiber based on the measurements of distributed strain.

At step 320, a second sensing device uses one or more localized position sensors to produce measurements (e.g., localized measurements) of positional characteristics of portions of the distributed spatial sensor. The positional characteristics of a portion of the distributed spatial sensor may include the position (e.g., spatial and/or angular position) of that portion of the distributed spatial sensor. In some embodiments, at least one of the localized position sensors produces measurements of the angular position of a portion of the distributed spatial sensor. For example, a localized position sensor may be an IMU, a gyroscope, an accelerometer, and/or a magnetometer. In some embodiments, at least one of the localized position sensors produces measurements of the spatial position of a portion of the distributed spatial sensor. For example, a localized position sensor may be a pressure sensor, a positioning system receiver, or an imaging device. In some embodiments, at least one of the localized position sensors produces measurements of the gravity vector acting on a portion of the distributed spatial sensor.

In some embodiments, each localized position sensor is connected to a corresponding portion of the distributed spatial sensor. For example, the localized position sensors may be connected to the corresponding portions of the distributed spatial sensor by a suitable cable, which may provide inter-sensor calibration data indicating which localized position sensor is connected to which portion of the distributed spatial sensor. In some embodiments, at least one of the localized position sensors is connected to an end portion of the distributed spatial sensor.

At step 330, an estimation unit performs state estimation based on the measurements provided by the first and second sensing devices. In some embodiments, the estimated states include at least one navigational parameter. The navigational parameter may be a location, orientation, shape, or velocity of at least a portion of the distributed spatial sensor. In some embodiments, the estimation unit also estimates uncertainty in the estimated value(s) of the navigation parameter(s) based on the measurements provided by the first and second sensing devices.

In some embodiments, the estimation unit estimates the value of at least one compensation parameter of the first sensing device. In some embodiments, the value of compensation parameter is indicative of an error in the distributed spatial sensor's measurement of the angular position of a portion of the distributed spatial sensor. In some embodiments, the first sensing device produces corrected measurements based on the value of the compensation parameter and the raw measurements produced by the distributed spatial sensor (e.g., by applying a corrective model to the raw measurements, wherein the compensation parameter is a parameter of the corrective model). In some embodiments, the first sensing device recalibrates the distributed spatial sensor based on the estimated value of the compensation parameter.

In some embodiments, the estimation unit estimates the value of at least one compensation parameter of the second sensing device. In some embodiments, the value of compensation parameter is indicative of an error in a localized position sensor's measurement of its position (which corresponds to the position of a portion of the distributed spatial sensor). The error in the position measurement may be caused by bias error, scale factor error, gravity-sensitive error, misalignment error, etc. in the sensor. In some embodiments, the second sensing device produces corrected measurements based on the value of the compensation parameter and the raw measurements produced by the localized position sensor (e.g., by applying a corrective model to the raw measurements, wherein the compensation parameter is a parameter of the corrective model). In some embodiments, the second sensing device recalibrates the localized position sensor based on the estimated value of the compensation parameter.

To estimate the values of the navigational parameters, the values of the compensation parameters, and/or uncertainties thereof, the estimation unit may use any suitable state estimation technique(s), including, without limitation, Kalman filtering, enhanced Kalman filtering, particle filtering, weighted averaging, generalized state space estimation, optimal state estimation, etc. In some embodiments, the inputs to the state estimation processes include the distributed measurements, the localized measurements, and/or the inter-sensor calibration data.

In some embodiments, the estimation unit determines whether at least one of the localized position sensors is stationary or in a quasi-static state based, at least in part, on the measurements provided by the first sensing device, the measurements provided by the second sensing device, and/or the inter-sensor calibration data. When the estimation unit determines that a localized position sensor is stationary or in a quasi-static state, the estimation unit may initiate a zero velocity update (ZUPT) of the sensor.

In some embodiments, the method 300 further includes an initialization step. In the initialization step, the estimated values of the states (e.g., navigational parameters, positional characteristics, spatial characteristics, compensation parameters, etc.) and the estimated uncertainties of the estimated state values are initialized. In embodiments in which the estimation unit uses a Kalman filter, the estimated uncertainty may be represented as a covariance matrix. Other representations of estimated uncertainty are possible.

Exemplary Cables for Connecting Sensors

Figure 4C:
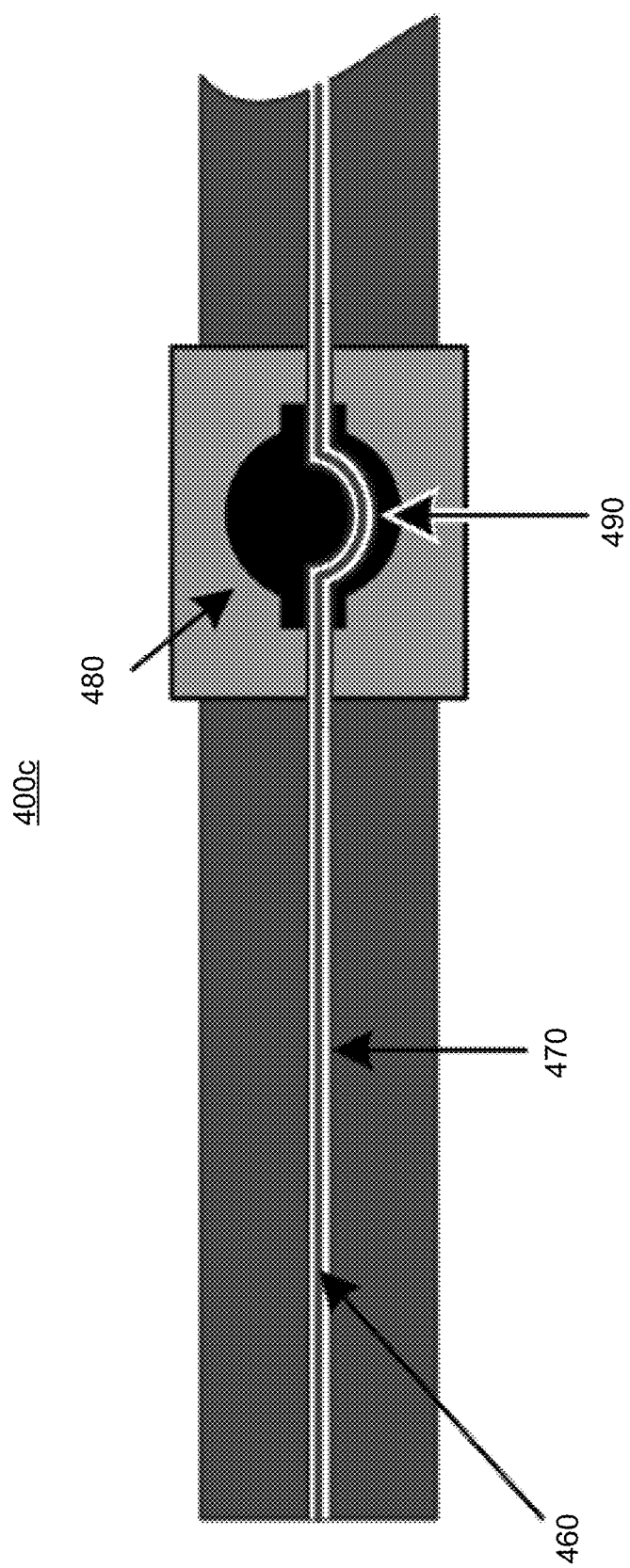

FIGS. 4A, 4B, and 4C show sensing cables 400 for connecting a distributed spatial sensor and one or more localized position sensors, according to some embodiments.

In some embodiments, a sensing cable 400 may include two or more modular segments 410, as can be seen in the examples of FIGS. 4A and 4B. Each segment 410 of a sensing cable 400 may include an associated portion 420 of a distributed spatial sensor and one or more localized position sensors. In some embodiments, this modular configuration may be advantageous for manufacturability, because each segment 410 may be calibrated individually during manufacture. Calibration of each segment 410 may include individual calibration of the associated portion 420 of distributed spatial sensor (see, e.g., U.S. Pat. No. 8,531,655) and individual calibration of the associated localized position sensors, as well as joint calibration of the portion 420 of the distributed spatial sensor and the localized position sensor(s). In some embodiments, the lengths of the modular segments 410 may be determined based on considerations associated with the manufacturing process and/or the calibration process. In some embodiments, the modular segments 410 may be approximately 500 meters long, and 20 or more modular segments 410 may be joined to form a sensing cable with a length of 10 km or greater.

In the examples of FIGS. 4A and 4B, individual cable segments 410 are joined at nodes 430 during the assembly process. Each node 430 may offer a convenient place to house one or more localized position sensors, and/or other components associated with the distributed fiber optic sensor (e.g., passive optical coupling devices, powered optical amplifiers, etc.). The nodes 430 may comprise regions of the cable 400 with different dimensions or mechanical properties and may be configured to protect the sensors inside and/or to provide convenient access for servicing the cable.

In embodiments in which the distributed spatial sensor is a shape sensing optical fiber, each portion 420 of the distributed spatial sensor may be a fiber optic segment, and the individual fiber optic segments may be joined at each node 430 using any suitable technique. For example, as shown in FIG. 4A, the fiber optic segments 420a may be spliced together to form a continuous, serial sensor. Alternatively, as shown in FIG. 4B, the modular cable 400b may be constructed in a parallel configuration in which one or more standoff cables 440 are housed in each cable segment along with the a calibrated portion 420 of the sensing fiber. These standoff cables 440 may be spliced together (not shown) to provide a contiguous signal path to and from the portions 420 of sensing fiber. Each parallel string of standoff fibers may terminate 450 at a portion of sensing fiber.

Exemplary Functional Linkages for Sensor Systems

In some embodiments of a system (100, 200) for determining the shape and/or position of an object, the flexible sensing component (e.g., flexible cable or fiber) of a distributed spatial sensor (112, 212) may be functionally linked to one or more localized position sensors (122, 222). In some embodiments, this functional linkage includes a physical linkage whereby the two types of sensors are physically fixed to one another such that their relative positions and orientations are known. This physical linkage may be achieved through sensor packaging in which the flexible sensing component is routed in such a way that it is clamped or fixed to the localized position sensor(s). In some embodiments, it may be advantageous to allow the flexible sensing component to slide freely inside of its packaging. This free-floating design may be used to isolate the flexible sensing component from external stimuli such as strain induced by external forces or cable drag or pressure.

FIG. 4C shows a portion of a sensing cable 400c, according to some embodiments. In the example of FIG. 4C, a flexible sensing component 460 (e.g., an optical fiber) of a distributed spatial sensor (e.g., a FOSS) floats freely inside an internal packaging tube 470 of the cable 400c. This internal packaging tube 470 is fixed to the localized position sensors 480 such that the internal packaging tube exhibits a distinguishable feature 490 (e.g., a recognizable shape) at the precise location of each localized position sensor 480. The distinguishing feature 490 may provide orientation and/or position information. In some embodiments, a distinguishing feature 490 includes a planar bend, an S-curve, a more complex three-dimensional shape, etc.

As the flexible sensing component 460 of the distributed spatial sensor is allowed to slide freely inside the internal packaging tube 470, data processing techniques may be used to determine the precise location and orientation of each of the recognizable features, thereby linking the distributed spatial sensor to the localized position sensor(s). Any suitable data processing technique may be used, including but not limited to performing singular-value decomposition on the distributed spatial sensor's 3D position data.

Exemplary Calibration Methods

In some embodiments, a distributed spatial sensor and localized position sensor(s) may be calibrated individually to produce their respective outputs. Some examples of calibration methods for shape sensing optical fibers are described in U.S. Pat. No. 8,531,655. Such calibration methods may involve introducing the sensor to a set of known stimuli in the form of calibration shapes and determining physical calibration coefficients from the measurements provided by the sensor in response to the stimuli. After calibration, some embodiments of the shape sensing optical fiber may be able to produce accurate, low-drift measurements of 3D shape, position, and orientation independently of other sensors.

Joint calibration of a distributed spatial sensor 112 and one or more localized position sensors 122 may be performed to link the outputs of the distributed spatial sensor and the localized position sensor(s). Such joint calibration may be performed, for example, during the manufacture of a sensor system 100. In some embodiments, joint calibration includes determining the location(s) where a flexible sensing component (e.g., a shape sensing optical fiber) is co-located with the localized position sensor(s). These locations may be determined using any suitable technique, including but not limited to introducing a point strain, tight bend, or localized temperature change to the optical fiber at the precise location of the localized position sensor and observing the measurement response of the distributed spatial sensor.

In some embodiments, joint calibration methods include steps taken to determine the noise or error statistics specific to each individual sensor or class of sensors. This noise or error characterization may be obtained through the measurement of various fixed shapes or the execution of a known movement along a prescribed path. This noise or error characterization may be used to refine the state estimation technique (e.g., Kalman filtering) performed by the estimation unit 130 to produce a better estimate of the state of the sensor system 100 given imperfect inputs from the distributed spatial sensor 112 and the localized position sensor(s) 122. In some embodiments, model refinements may be made for classes of sensors (e.g., for an individual design of shape sensing optical fiber or for a particular grade of IMU). Additionally or in the alternative, this joint calibration process may be used to refine the state estimation models of individual sensors (e.g., removal of shape-dependent error arising from geometrical imperfections in a specific length of shape sensing optical fiber).

In some embodiments, joint calibration may be performed in-situ through introduction of controlled conditions during navigation. For example, a zero-velocity update (ZUPT) may be performed to calibrate a sensor (e.g., IMU) of a navigation system when the sensor is not moving. Some applications of ZUPT in navigational systems (100, 200) are described above.

Exemplary Coordinate System Anchoring Techniques

In some embodiments, the flexible sensing component (e.g., optical fiber) of a distributed spatial sensor spans the entire length of a navigation cable, from a fixed position at a proximal end, to an unfixed position at a distal end. In such embodiments, the distributed spatial sensor may measure the position and orientation of an object or vehicle at the distal end of the cable, independently of other sensor systems. In such embodiments, the synthesis of data from the distributed spatial sensor and localized position sensors(s) may be used to improve the sensor system's estimate of the state of the flexible sensing component and the position and/or orientation of points (e.g., the distal endpoint) along the flexible sensing component.

In some embodiments, the flexible sensing component (e.g., optical fiber) of a distributed spatial sensor is shorter than the overall length of the navigation cable. In such embodiments, the distributed spatial sensor may provide limited spatial information (e.g., shape and position of a limited length of the flexible sensing component) to the estimation unit. In combination with input from the localized position sensor(s), the sensing system 100 may measure the position and orientation of the flexible sensing component's distal endpoint. In such embodiments, the proximal end of distributed spatial sensor is not anchored to a known position or orientation and the distributed spatial sensor therefore provides a relative measurement of the shape, position, and/or orientation of a region of cable. In some embodiments, the sensor system 100 is configured such that this limited length of the flexible sensing component is disposed in a region of interest. For example, this limited length may be disposed in a portion of a cable 400 expected to undergo multiple complex shape changes (e.g., the distal tip of a flexible sensing component disposed near a steering mechanism or a vehicle under navigation control).

Such limited-length embodiments may be well suited for use in path stitching applications in which the flexible sensing component of a distributed spatial sensor is pulled along a constrained path, such as through a network of pipes or tunnels. In path stitching applications, multiple measurements of the distributed spatial sensor may be made in succession such that each measurement represents a shape that overlaps one or more previous measurements. These overlapping shapes can be stitched together to provide a measurement of the overall path.

When a distributed spatial sensor alone is used for path stitching, the accuracy of the stitched path measurement is generally dependent on the shape of the path. For example, the suitability of a path for accurate path stitching by a distributed spatial sensor alone may depend on whether the path has a sufficient number of distinguishable features on a scale shorter than the functional sensor length to allow the stitching technique to uniquely determine (and maintain) an accurate measurement of orientation, including roll. By contrast, when the distributed spatial sensor is combined with one or more localized position sensors in a system 100, the system may alleviate the constraints on the path, because each localized position sensor may accurately inform the estimation unit of the sensor's orientation and position, even in the case in which the flexible sensing component is pulled along a straight, featureless path. In some embodiments, a single localized position sensor is located at the proximal or distal end of the functional length of the flexible sensing component.

Further Description of Some Embodiments

Systems (100, 200) and methods (300) for determining the shape and/or position of an object have been described. Portions of such systems (e.g., the computer 113 of the first sensing device 110, the computer 123 of the second sensing device 120, and the estimation unit 130 or portions thereof) may be implemented using one or more computers. Likewise, the method 300 or portions thereof (e.g., steps of the method 300) may be performed using one or more computers. Such computers can be implemented in digital electronic circuitry, or in computer software, firmware, and/or hardware, including the structures disclosed herein and their structural equivalents, or in combinations of one or more of them. Portions of the subject matter described in this disclosure can be implemented as one or more computer programs, i.e., one or more modules of computer program instructions, encoded on a computer storage medium for execution by, or to control the operation of, data processing apparatus.

Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some embodiments of the methods, steps, and tools described in the present disclosure can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, for example web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some embodiments of the processes and logic flows described in this disclosure can be performed by one or more programmable processors executing one or more computer programs to perform actions by operating on input data and generating output. Some embodiments of the processes and logic flows described herein can be performed by, and some embodiments of the apparatus described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

Figure 5:
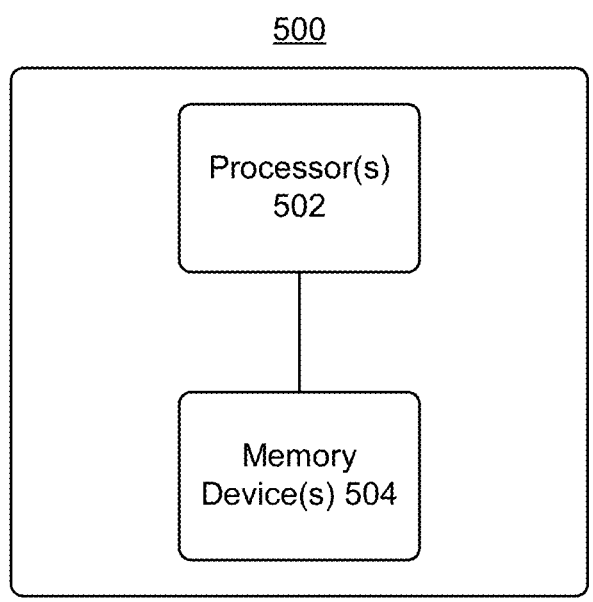
FIG. 5 shows a block diagram of a computer, according to some embodiments.

FIG. 5 shows a block diagram of a computer 500. The elements of the computer 500 include one or more processors 502 for performing actions in accordance with instructions and one or more memory devices 504 for storing instructions and data. In some embodiments, one or more programs executing on one or more computers 500 controls the system 100 to perform the method 300. In some embodiments, one or more programs executing one or more computers 500 implement the tasks of the computer 113 of the first sensing device 110, the tasks of the computer 123 of the second sensing device 120, and/or the tasks of the estimation unit 130. Different versions of the program(s) executed by the computer(s) 500 may be stored, distributed, or installed. Some versions of the software may implement only some embodiments of the methods described herein.

Generally, a computer 500 will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this disclosure can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Some embodiments can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this disclosure contains many specific implementation details, these should not be construed as limitations on the scope of any inventions or of what may be claimed, but rather as descriptions of features specific to particular implementations of particular inventions. Certain features that are described in this disclosure in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations may be described in this disclosure or depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Terminology

The phraseology and terminology used herein is for the purpose of description and should not be regarded as limiting.

The terms "approximately" or "substantially", the phrases "approximately equal to" or "substantially equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Equivalents

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A navigation system, comprising:
   a first sensing device comprising a distributed fiber optic shape sensor including an optical fiber with a length of at least 100 meters, wherein the first sensing device is operable to produce distributed measurements of one or more spatial characteristics of the distributed fiber optic shape sensor selected from the group consisting of shape, spatial position, and angular position;

a second sensing device comprising one or more localized position sensors corresponding to one or more respective portions of the distributed fiber optic shape sensor, wherein the second sensing device is operable to produce, for each of the localized position sensors, localized measurements of an angular position of the corresponding portion of the distributed fiber optic shape sensor; and an estimating unit operable to estimate one or more states of the navigation system based, at least in part, on the distributed measurements and the localized measurements and to perform a mutual correction of errors in the measurements of the first and second sensing devices based on the measurements of the respective other one of the first and second sensing devices.

2. The system of claim 1, wherein the distributed fiber optic shape sensor comprises a distributed fiber optic shape sensor comprising an optical fiber.

3. The system of claim 2, wherein the optical fiber comprises one or more optical fiber cores.

4. The system of claim 2, wherein the distributed fiber optic shape sensor is operable to produce measurements of distributed strain along the optical fiber, and wherein the first sensing device is operable to produce the distributed measurements of the one or more spatial characteristics of the distributed fiber optic shape sensor based, at least in part, on the measurements of the distributed strain along the optical fiber.

5. The system of claim 1, wherein the second sensing device comprises a magnetometer or an inertial measurement unit comprising at least one sensor selected from the group consisting of a gyroscope and an accelerometer.

6. The system of claim 1, wherein each localized position sensor comprises a magnetometer.

7. The system of claim 1, wherein the one or more localized position sensors comprise at least one sensor device operable to produce measurements of a spatial position of a corresponding portion of the distributed fiber optic shape sensor.

8. The system of claim 7, wherein the sensor device is selected from the group consisting of a pressure sensor and a positioning system receiver.

9. The system of claim 7, wherein the sensor device comprises an imaging device.

10. The system of claim 1, wherein the second sensing device is further operable to produce, for each of the localized position sensors, localized measurements of a gravity vector at the corresponding portion of the distributed fiber optic shape sensor.

11. The system of claim 1, wherein the one or more localized position sensors comprise a first position sensor, the one or more portions of the distributed fiber optic shape sensor comprise a first portion of the distributed fiber optic shape sensor, the first position sensor corresponds to the first portion of the distributed fiber optic shape sensor, and the first position sensor is connected to the first portion of the distributed fiber optic shape sensor.

12. The system of claim 11, wherein the first portion of the distributed fiber optic shape sensor comprises an end portion of the distributed fiber optic shape sensor.

13. The system of claim 1, wherein the first sensing device is further operable to determine one or more positions of the one or more portions of the distributed fiber optic shape sensor corresponding to the one or more respective localized position sensors.

14. The system of claim 1, wherein the one or more estimated states of the system comprise at least one navigational parameter selected from the group consisting of a location of at least a portion of the distributed fiber optic shape sensor, an orientation of at least a portion of the distributed fiber optic shape sensor, a shape of at least a portion of the distributed fiber optic shape sensor, and a velocity of at least a portion of the distributed fiber optic shape sensor.

15. The system of claim 14, wherein the estimating unit is further operable to estimate an uncertainty in the at least one navigational parameter based, at least in part, on the distributed measurements and the localized measurements.

16. The system of claim 1, wherein the estimating unit is operable to estimate the one or more states using at least one filter selected from the group consisting of a Kalman filter, an enhanced Kalman filter, and a particle filter.

17. The system of claim 1, wherein the estimating unit is operable to estimate the one or more states using at least one numerical state estimation technique selected from the group consisting of weighted averaging, generalized state space estimation, and optimal state estimation.

18. The system of claim 1, wherein the estimating unit is operable to estimate the one or more states based, at least in part, on calibration data indicating one or more positions of the one or more portions of the distributed fiber optic shape sensor corresponding to the one or more respective localized position sensors.

19. The system of claim 1, wherein the first sensing device is operable to produce a first measurement of a position of an end portion of the distributed fiber optic shape sensor, the second sensing device is operable to produce a second measurement of the position of the end portion of the distributed fiber optic shape sensor, the one or more estimated states comprise an estimate of the position of the end portion of the distributed fiber optic shape sensor, and the estimate of the position of the end portion of the distributed fiber optic shape sensor is more accurate than the first and second measurements of the position of the end portion of the distributed fiber optic shape sensor.

20. The system of claim 1, wherein the estimating unit is further operable to estimate a value of a compensation parameter of the first sensing device based, at least in part, on the localized measurements.

21. The system of claim 20, wherein the distributed measurements produced by the first sensing device comprise corrected distributed measurements, the distributed fiber optic shape sensor is operable to produce raw distributed measurements of one or more spatial characteristics of the distributed fiber optic shape sensor, and the first sensing device is operable to produce the corrected distributed measurements based, at least in part, on the raw distributed measurements and the estimated value of the compensation parameter.

22. The system of claim 21, wherein the first sensing device is further operable to use the compensation parameter to compensate for an error in a measurement of an angular position of a portion of the distributed fiber optic shape sensor.

23. The system of claim 21, wherein the estimated value of the compensation parameter is indicative of an error in a measurement of an angular position of a portion of the distributed fiber optic shape sensor.

24. The system of claim 20, wherein the first sensing device is further operable to calibrate the distributed fiber optic shape sensor based, at least in part, on the estimated value of the compensation parameter.

25. The system of claim 1, wherein the one or more position sensors comprise a first position sensor corresponding to a first portion of the distributed fiber optic shape sensor, and wherein the estimating unit is further operable to estimate a value of a compensation parameter of the first position sensor based, at least in part, on the distributed measurements.

26. The system of claim 25, wherein the localized measurements produced by the second sensing device comprise corrected localized measurements, each of the position sensors is operable to produce raw localized measurements of one or more positional characteristics of the corresponding portion of the distributed fiber optic shape sensor, and the second sensing device is operable to produce the corrected localized measurements based, at least in part, on the raw localized measurements and the estimated value of the compensation parameter.

27. The system of claim 26, wherein the second sensing device is further operable to use the compensation parameter to compensate for at least one error of the first position sensor selected from the group consisting of a bias error, a scale factor error, a gravity-sensitive error, and a misalignment error.

28. The system of claim 26, wherein the estimated value of the compensation parameter is indicative of at least one error of the first position sensor selected from the group consisting of a bias error, a scale factor error, a gravity-sensitive error, and a misalignment error.

29. The system of claim 25, wherein the second sensing device is further operable to calibrate the first position sensor based, at least in part, on the estimated value of the compensation parameter.

30. The system of claim 1, wherein the estimating unit is further operable to:
determine whether at least one of the one or more localized position sensors is in a quasi-static state based, at least in part, on the distributed measurements; and
initiate a zero velocity update of the at least one localized position sensor when it is determined that the at least one localized position sensor is in the quasi-static state.

31. The system of claim 1 further comprising a mobile device, wherein the estimated one or more states of the system comprise at least one navigational parameter selected from the group consisting of a location of the mobile device, an orientation of the mobile device, and a path of the mobile device.

32. The system of claim 31, wherein the mobile device is selected from the group consisting of a robot, a medical instrument, a drill, and a vehicle.

33. The system of claim 31, wherein the estimating unit is further operable to perform at least one task selected from the group consisting of simultaneous localization and mapping (SLAM) and path stitching based, at least in part, on the estimated at least one navigational parameter.

34. A navigation method, comprising:
producing distributed measurements of one or more spatial characteristics of a distributed fiber optic shape sensor comprising an optical fiber with a length of at least 100 meters, the spatial characteristics selected from the group consisting of shape, spatial position, and angular position;

for each of one or more localized position sensors corresponding to one or more respective portions of the distributed fiber optic shape sensor, producing localized measurements of an angular position of the corresponding portion of the distributed fiber optic shape sensor;

estimating one or more states of a navigation system based, at least in part, on the distributed measurements and the localized measurements; and performing a mutual correction of errors in the distributed measurements based on the localized measurements and of errors in the localized measurements based on the distributed measurements.

* * * * *